United States Patent
Rice et al.

(10) Patent No.: US 6,707,002 B2
(45) Date of Patent: Mar. 16, 2004

(54) METHOD AND APPARATUS FOR WELDING AND CONTROL THEREOF

(75) Inventors: Jody K. Rice, Appleton, WI (US); Richard M. Hutchison, New London, WI (US); Galen J. White, Kimberly, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/366,102

(22) Filed: Feb. 12, 2003

(65) Prior Publication Data

US 2003/0155337 A1 Aug. 21, 2003

Related U.S. Application Data

(62) Division of application No. 09/884,235, filed on Jun. 19, 2001, now Pat. No. 6,531,684.

(51) Int. Cl.[7] .................................................. B23K 9/10
(52) U.S. Cl. ................ 219/130.5; 219/127; 219/137.71
(58) Field of Search ............................. 219/130.5, 127, 219/132, 137.71

(56) References Cited

U.S. PATENT DOCUMENTS

| | | | | |
|---|---|---|---|---|
| 3,013,144 A | * | 12/1961 | Adamson et al. | 219/137.71 |
| 3,102,948 A | * | 9/1963 | McCampbell et al. | 219/127 |
| 3,188,375 A | * | 6/1965 | Adamson et al. | 219/130.5 |
| 3,569,663 A | * | 3/1971 | Weman | 219/127 |
| 4,608,482 A | * | 8/1986 | Cox et al. | 219/132 |

OTHER PUBLICATIONS

Millermatic® 250, Owner's Manual, Mar. 1998.

* cited by examiner

*Primary Examiner*—Clifford C. Shaw
(74) *Attorney, Agent, or Firm*—George R. Corrigan (57) ABSTRACT

A method and apparatus for welding includes one or more of a welding type power source, a feedback circuit, a wire feeder and a controller. The controller preferably has an eta control circuit responsive to the feedback. It also has a control loop having a response time responsive to the eta output. The controller detects whether or not the process is a fast-tack process, and controls the supply of power according to a first control scheme is the process is a fast-tack process, and according to a second control scheme if the process is not a fast-tack process. The controller sets the run-in wire feed speed as a percentage of weld wire feed speed, preferably obtaining the percentage from the weld wire feed speed potentiometer at start up. The controller enters a calibration mode at start up if a calibration pendant is attached and on. In the calibration mode calibration receiving values from the front panel potentiometers.

17 Claims, 4 Drawing Sheets

METHOD AND APPARATUS FOR WELDING AND CONTROL THEREOF

This is a divisional of application Ser. No. 09/884,235, filed on Jun. 19, 2001 now U.S. Pat. No. 6,531,684.

FIELD OF THE INVENTION

The present invention relates generally to the art of welding power supplies. More specifically, it relates to the control and/or calibration of welding power supplies.

BACKGROUND OF THE INVENTION

There are many known welding power supplies used for a variety of welding processes. Welding power supply or system for welding, as used herein, includes one or more of the following components: a wire feeder, a power source or source of power, a torch or gun, a controller, including a wire feeder controller, and a power source controller to control the various components (it may also exclude some of these components). The components may share a housing, or be in separate housings.

Power source, or source of power, as used herein, includes the power circuitry such as rectifiers, switches, transformers, SCRs, etc that process and provide the output power. Controller, as used herein, includes digital and analog circuitry, discrete or integrated circuitry, microprocessors, DSPs, etc., software, hardware and firmware, located on one or more boards, and used to control a welding process, or a device such as a power source or wire feeder.

The components of a welding power supply cooperate to produce a welding output. Generally, the controller controls the other components such that the output parameters (welding current and/or voltage, wire feed speed, etc.) are at a desired level, either set by the user or set by the power supply for the type of process being used.

There are numerous control schemes currently being used. Typically, a control scheme includes receiving feedback, and controlling a command signal in response to that feedback. Feedback, as used herein, includes a signal indicative of or responsive to an output or intermediate signal, which is provided to the controller and control decisions are made in response thereto. Responsive to a parameter, as used herein, includes responding to changes in a value of the parameter or a function of that parameter, such as changing the value of a control signal or other parameter, opening or closing a switch, etc.

Prior art controllers use any number of well known control schemes, such as PID control, comparing a feedback signal to a threshold, open loop control, etc. An example of a prior art control scheme is the control scheme in the MM250®. That control is particularly well suited for MIG welding.

The MM250® controller receives two user-selectable inputs, one indicating desired welding voltage, and the other desired wire feed speed. User-selectable, as used herein, includes the user setting an operating parameter set point. The controller also receives feedback of these parameters, and compares the set points to the fedback back values. The difference between the set point and the fedback value, or difference error, is integrated over time, and used to change commands such that the output tends to the set point.

One welding process is a short-arc process (and is performed particularly well by the MM250® power supply). The process has an arc phase, in which the wire advances to the puddle faster than it is melted by the arc. Eventually it reaches the puddle, and the process enters the short phase. Current flow increases in this phase, until it causes a molten metal bridge between the weld puddle and the wire to be broken. This causes the short to be opened, and the process returns to the arc phase. The process alternates between the short and arc phases many times each second.

Prior art short arc-welding systems use voltage control in order to maintain a relatively constant average arc length during welding. This may consist of an open loop system in a constant voltage tapped transformer machine or a voltage control loop. Control loop, open or closed, as used herein, includes a portion of a controller that controls in response to the value of a particular variable.

A prior art voltage control loop filters voltage feedback and compares it to a user-selected voltage set point. The difference, or error, between the set point and actual voltage will result in an adjustment of the output of the welder in the appropriate direction to bring the actual arc voltage closer to the set point.

The amount of filtering of the voltage feedback signal, (or alternately, the error) affects response time and stability. Response time, as used herein, includes the time it takes for a control loop to change the control output in response to changes in a fed back variable. If the filtering is excessive, the response time will be slow, and the output of the machine will not be able to respond to changes in arc length quickly enough and the process may become unstable. If the response time is too short, the intrinsic stability of the periodic molten puddle oscillations may be perturbed and the characteristic regular audible feedback from the process (a.k.a. 'the buzz') can be compromised.

The prior art has suggested that the variable eta may be useful in controlling the welding process. Eta, as used herein, is Tsht/(Tsht+Tarc), where Tsht is the length of time of a short circuit and Tarc is the length of time of the successive arc. Some prior art literature suggests that the MIG welding process will be more stable when eta has a value between 0.2 and 0.3. However, prior art control schemes, particularly those used for CV output, do not generally monitor eta, much less control in response to it.

Accordingly, a welding power supply that provides a fast response, yet avoids instability, is desirable. Additionally, a welding power supply that determines eta, and controls in response to eta, is desirable.

Another welding process (which may be used with or without short arc welding) is a fast-tack process. Fast-tack process, as used herein, includes a welding process consisting of successive short-duration arcs or welds, typically separated by trigger releases and re-triggering at a new location, or at the same location, whereby the process is a start and stop welding process. Such a process is often used to tack weld two components prior to a more complete welding or bonding of them. Arc, as used herein, includes a single arc or a number of sequential arcs, such as those in a fast-tack process MIG welding may be described as four fundamental sequential states: wait, run-in, weld, and burnback. During the wait state the controller is waiting for a gun or torch trigger, which signals the users intent to weld. The transition to run-in begins when the trigger signal is received. During the run-in state the wire begins to move toward the base metal and the power source produces open circuit voltage. The transition to the weld state occurs when current is detected (indicating an arc or short has been established). During the weld state the wire feeds at a constant speed, and the power source is regulated at a constant voltage in order to maintain a steady arc length. The transition to burnback begins when the trigger signal indicates the trigger has been released. During the burnback state the wire feed motor brakes to stop the wire as quickly as possible, and the power source maintains a constant voltage. As the wire feeder is braking, and the wire feed speed is decreasing, the output voltage ensures that the wire will not stick into the freezing weld pool on the base metal. The transition back to the wait state occurs when a burnback timer expires. These states repeat with the next weld.

Some prior art systems used for fast-tack welding allow the operator to set the desired voltage and wire feed speed for the weld state. However, other parameters such as: wire feed speed during run-in; ramp to run-in wire feed speed (an acceleration parameter which determines how quickly the run-in wire feed speed is achieved); ramp to weld wire feed speed (an acceleration parameter which determines how quickly the weld wire feed speed is achieved); open circuit voltage (the output voltage from the power source during run-in); and burnback voltage (the output voltage from the power source during burnback) affect the welding process.

These parameters (called auxiliary parameters) may be optimized to achieve a good start and stop for each weld. However, the values that optimize a particular start and stop depend on the condition (heat) of the base material and wire—and thus are different for fast-tack welds than for other welds.

Prior art controllers do not provide for user adjustment of the auxiliary parameters, and they are based on the user-set weld voltage and the user set wire feed speed settings. Unfortunately, because welding power supplies are usually used for more than one process, the auxiliary parameters are not optimized for fast-tack welding, but rather for more typical welding processes (or set to a mid range that is perhaps adequate, but not optimal for many processes).

Accordingly, a welding system with a controller that senses when a fast-tack process is being used, and adjusts parameters in response thereto is desirable.

Some prior art welding applications set the run-in wire feed speed and the weld wire feed speed using two separate potentiometers on the welding power supply control panel. One potentiometer is used to set the welding wire feed speed and the other potentiometer is used to set the run-in wire feed speed. Both settings are typically in inches per minute, and each setting is independent of the other. This control scheme is simple and easy to implement. However, the operator must change two potentiometers in order to maintain the same ratio between the two settings.

Another prior art wire feed controller uses a single potentiometer to set both weld wire feed speed and run-in wire feed speed. A microcontroller (also called microprocesor) in the wire feed speed control interprets the position of the control knob as indicating run-in wire feed speed under certain conditions—when power is applied to the machine and the trigger is engaged, e.g.

According to an algorithm initiated when power is applied to the machine and the trigger is engaged, if the control potentiometer is fully counter clockwise, a run-in wire feed speed of 50 IPM is registered. If the control potentiometer is fully clockwise, the run-in wire feed speed is the same as the weld wire feed speed. The position of the knob when the trigger is engaged other than at start-up indicates the weld wire feed speed. This control is more difficult to implement, and the run-in wire feed speed is independent of the weld wire feed speed and the ratio of run-in to weld wire feed speed changes when the operator changes the weld wire feed speed.

Accordingly, a weld wire feed speed setting that is set as a percentage of weld wire feed speed is desirable. It will preferably use a single potentiometer.

Any control scheme needs accurately scaled inputs and outputs (commands) to accurately control a welding process. Prior art welding power supplies scale the inputs and outputs by calibrating the control board, to compensate for tolerances in the components used.

Typically, potentiometers on the control board are adjusted at the manufacturer. One calibration technique is to adjust the front panel potentiometer (user-selectable input) to a minimum value. Then, the output is measured and a control board potentiometer is adjusted until the output is the desired minimum output. For example, if the machine minimum output load voltage is supposed to be 14 volts, then the user-adjustable potentiometer on the front panel is set to the minimum. If the measured output load voltage is 15 volts, the control board calibration potentiometer is adjusted to lower the output voltage to 14 volts.

The process is repeated for the desired maximum output load voltage. Using two calibration potentiometers results in a slope calibration (the adjusted value is determined by a line equation). Other calibrations use two points other than the max and min, such as the max and mid-range. The control board calibration potentiometers may scale the feedback inputs, or the command outputs. In addition to load voltage, wire feed speed is also calibrated.

This calibration scheme is easy to implement, however the tolerance and drift in the potentiometer used for calibration adds to the total error tolerance of the system. Also, the initial setting of a potentiometer is unknown and it is often desirable to have a baseline, or starting point.

Accordingly, a welding power supply that may be calibrated such that the calibration does not drift and add to the system error is desirable. Preferably, it will be able to store the calibration values, and be able to provide them to the user.

SUMMARY OF THE PRESENT INVENTION

According to a first aspect of the invention a system for welding includes a welding-type power source, a feedback circuit and a controller. The power source has at least one control input and a welding-type output. The feedback circuit is responsive to the welding-type output and has a feedback output. The controller has a feedback input connected to the feedback output, an eta control circuit responsive to the feedback input, and an eta output. It also has at least one control loop having a selectable response time, and a response time selector responsive to the eta output. A control output is connected to the control input.

According to a second aspect of the invention a system for welding includes a welding-type power supply that has at least one control input and a welding-type output. A feedback circuit is responsive to the welding-type output, and has a feedback output. A controller has a feedback input connected to the feedback output of the feedback circuit, a voltage control loop responsive to the feedback input, and a temporal control loop responsive to the feedback input. It has a control output, responsive to that voltage control loop and the temporal control loop, connected to the control input.

According to a third aspect of the invention a welding-type power supply controller includes at least one feedback input, a voltage control loop, and an eta controller. The voltage control loop includes a voltage feedback input connected to the feedback input, and an integrator with first and second feedback capacitors. A switch, with a switch control input, is in series with the second capacitor. The eta controller has an input connected to the feedback input and an output connected to the switch control input.

According to a fifth aspect of the invention a method of providing welding power includes providing a welding-type power output, feeding back a parameter of the power output and controlling the welding-type power in response to the feeding back using a voltage control loop and a temporal control loop.

According to a sixth aspect of the invention a method of controlling welding-type power includes providing voltage feedback, integrating the difference between a voltage feedback and a threshold using an integrator with first and second capacitors in a feedback path, comparing eta to a window, and switching the second feedback capacitor in and out of the feedback path in response to comparing eta.

The control loop has at least two response times, or a plurality of response times chosen from a range of response times in various embodiments.

The power source is an SCR based, phase controlled, power source and/or the controller is a microprocessor controller in other embodiments.

The feedback circuit includes a voltage feedback circuit, the response time selector includes an integrator responsive to an eta window, and/or the control loop includes a voltage control loop and a temporal control loop in alternative embodiments.

According to a seventh aspect of the invention a method of providing welding power includes providing a welding-type output, and feeding back an output parameter. Eta is determined, and the welding-type output is controlled in response to the feeding back. A response time is selected in response to eta.

According to an eighth aspect of the invention a system for welding includes a welding power source, a wire feeder, a feedback circuit, and a controller. The power source has at least one power source control input and a welding power output. The wire feeder is connected to the welding power output and has a wire feed speed input. The feedback circuit is responsive to the welding power output, and has a feedback output. The controller has a feedback input connected to the feedback output and a fast-tack detect circuit responsive to a trigger signal. It also has a speed control output responsive to the fast-tack detect circuit, and in electrical communication with the wire feed speed input, and a power source control output responsive to the fast-tack detect circuit, and in electrical communication with power source control input.

According to another aspect of the invention a method of welding includes supplying welding power to an arc, feeding wire to the arc, feeding back a signal responsive to the welding power, detecting whether or not the process is a fast-tack process, controlling the supply of power according to a first control scheme if the process is a fast-tack process, and controlling the supply of power according to a second control scheme if the process is not a fast-tack process.

A fast-tack control circuit is disposed electrically between the fast-tack detect circuit and the power source control output, and disposed electrically between the fast-tack detect circuit and the wire-feed speed output and a weld control circuit is disposed electrically between the fast-tack detect circuit and the power source control output and disposed electrically between the fast-tack detect circuit and the wire-feed speed output in one alternative.

The power source control output includes a voltage command, including at least one of an open circuit command and a burn back command, and the wire feed speed output includes a ramp to run-in command, and/or the fast-tack detect circuit includes a timer circuit responsive to a trigger signal in other embodiments.

An inductor winding is in electrical communication with the welding power output and an auxiliary winding is in magnetic and electrical communication with the inductor winding. A switch circuit is in series with the auxiliary winding, and the switch circuit is responsive to the fast-tack detect circuit in another embodiment.

According to yet another aspect of the invention a system for welding includes a welding power source, a wire feeder and a controller. The welding power source has a welding power output connected to the wire feeder. The wire feeder has a speed control input connected to a speed control output of the controller. The speed control output has a weld wire speed set point, and a run-in wire speed set point. The run-in speed set point is a set percentage of the weld wire speed set point.

Another aspect of the invention is a method of welding that includes providing welding power to an arc, feeding wire to the arc, controlling the speed of the wire during a run-in state, and controlling the speed of the wire during a weld state. The run-in speed set is a set percentage of the weld speed.

The set percentage is a user selectable percentage, and/or between 25 percent and 150 percent in various alternatives.

The percentage is set using the weld wire feed speed input, and an enable signal in another alternative.

According to yet another aspect of the invention a welding-type power supply includes a power source, a controller, and a user-selectable input, such as a potentiometer. The controller is connected to the power source, and has at least one set point input, and at least one calibration input. The user-selectable input is connected to the at least one set point input, and connected to at the least-one calibration input.

According to another aspect of the invention a method of calibrating a welding-type power supply, of the type having a user-selectable set point input, includes detecting whether or not the power supply is in a calibration mode, receiving a value from the user-selectable set point input as a calibration value if the power supply is in the calibration mode, and receiving a value from the user-selectable set point input as a set point value if the power supply is not in the calibration mode.

An input-selection circuit, connected to the controller, enables one of the calibration input and set point input, and disables the other of the set point input and calibration input. A user-selectable switch, such as a toggle switch, is connected to the input-selection circuit in other embodiments The controller is a microprocessor controller, and stores at least one user-selected calibration value received on the calibration input in another embodiment.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are, used to indicate like components.

DETAILED DESCRIPTION OF THE PREFERRED EMBODIMENTS

While the present invention will be illustrated with reference to a particular welding power supply, used in a particular process, and implemented with particular components, it should be understood at the outset that the invention can also be implemented with other welding power supplies, other processes, and implemented with other components, software, hardware etc.

Generally, the various aspects of this invention will be described using a MIG welding power supply, such as the Miller MM250® welding power supply. This preferred embodiment includes a power source, a wire feeder, and a controller, that may be housed in a single housing, or in multiple housings. The controller may be on a single board, distributed on multiple boards, and a single housing, or distributed in multiple housings. The controllers preferably are comprised of analog and digital circuitry, although they may be implemented exclusively with either.

One aspect of the invention relates to the response time of the controller. The control scheme determines the value of eta. If eta is within a desirable window, then the control scheme provides for a relatively slow response time because the process should be stable with such an eta. However, if eta is outside the desirable window, then the control scheme provides for a faster response time because the process may be, or may be becoming, unstable, and a rapid output change is needed to bring the process back to a stable output. Window, as used herein, refers to a range of values that includes the desired set point and predetermined values both above and below the set point, not necessarily symmetrically disposed about the set point.

Figure 1:
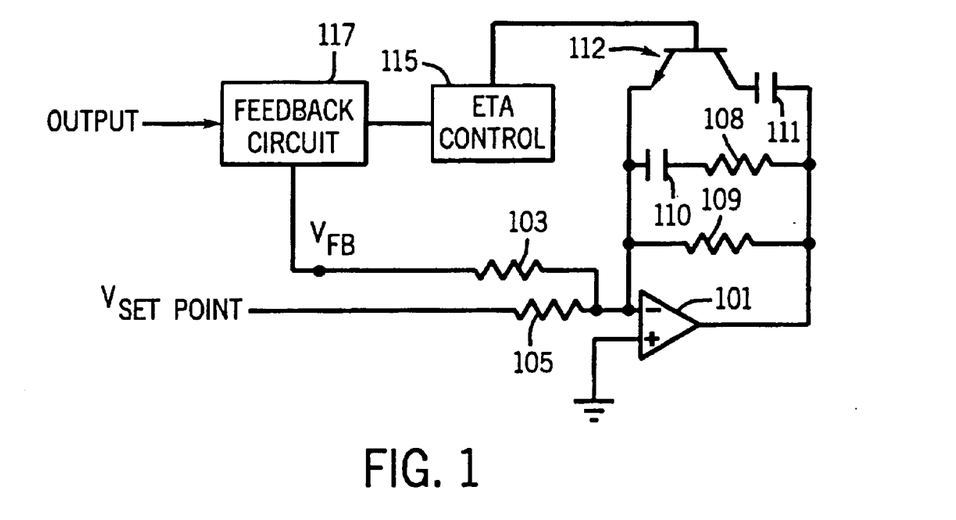
FIG. 1 includes a controller constructed in accordance with the preferred embodiment of one aspect of the invention.

Referring now to FIG. 1, the preferred embodiment implementing this aspect of the invention is shown. A voltage/eta controller includes a voltage it receives on an input to a voltage feedback input through a resistor 103 and a voltage set point signal through a resistor 105. These signals are of opposite polarity, so that the difference between them is applied to the input of the error amplifier 101. The feedback circuit of error amplifier 101 includes a feedback resistor 107, another feedback resistor 108, and capacitors 110 and 111.

A switch 112 is provided in electrical communication with, and preferably in series with, capacitor 111. Electrical communication with, as used herein, includes a connection wherein electrical signals and/or power may be provided or received. In series with, as used herein, includes connected such all current flowing in a first component flows in a second component, either directly or through intermediate components.

The controller for switch 112 opens and closes switch 112 based on the value of eta, by providing the appropriate gate signal or switch control input. Switch, as used herein, includes one or more switches (digital, analog, software or mechanical) commonly controlled. Switch control input, is an input to a switch that at least partially determines the state (on or off, e.g.) of the switch.

When switch 112 is closed, and capacitor 111 is in the feedback loop, the error amplifier has a slower response time, and thus the entire control has a slow response time. Conversely, when the capacitor is switched out of the feedback loop, the error amplifier has a faster response time, and thus the entire control has a faster response time. Switch 112 is open when eta has a value outside of the desired window of between 0.2 and 0.3.

Thus, it may be seen that the control has a slower response time when the process is stable (as indicated by eta being within the window of the 0.2 and 0.3), and, generally, the controller is a CV controller. The operation of the error circuit, other than the variable response time, is much like a typical error CV circuit. It includes an error amplifier receiving a voltage feedback signal and a voltage set point of opposite polarity. The difference between these two signals is amplified, integrated, and a command signal in response thereto, is provided as a control output, and received as a control input by the power source to adjust the output.

Control output, as used herein, includes an output used to control a power supply, such as a set point, gate signals, phase control signals, etc. Control input, as used herein, includes an input used to control a power supply, such as a set point, gate signals, phase control signals, etc.

The controller shown has two control loops: a voltage control loop having voltage feedback, and a nested, temporal control loop having eta as the control variable. Voltage control loop, as used herein, includes a control loop that controls in response to the value of a voltage variable. Temporal control loop, as used herein, includes a control loop that controls in response to the value of a time-based variable.

The temporal loop may be considered having a response time selector, because it adjusts the response time of the voltage loop. Response time selector, as used herein, includes a circuit that controls the response time of a control loop. The voltage loop has a selectable response time. Selectable, as used herein, includes being able to change a value or parameter to one of a plurality of values, or to a value in one or more continuum of values.

The controller also includes an eta control circuit 115, which determines if eta is within the window, such as by using two comparators, and provides an eta output that turns on and off switch 112. Eta control circuit, as used herein, includes a control circuit that provides an output responsive to eta. Eta output, as used herein, includes an output responsive to eta.

A feedback circuit 117 monitors the output voltage and provides a feedback output to a feedback input of the controller. The eta control circuit uses the voltage feedback to determine if the arc state is a short or an arc. Feedback circuit, as used herein, includes a circuit that provides a signal indicative of or responsive to an output or intermediate signal. Feedback input is an input on which a feedback signal is provided. Feedback output, as used herein, includes an output indicative of the value of a fedback parameter.

Alternative embodiments include providing a different window, or providing a response time that, rather than being selected from one of two values, it is within a range of response times. This may be accomplished by varying the relative amount of time switch 112 is closed, such as by pulse width modulation, or varying time on and time off etc. This provides a variable capacitance and a variable response time of any value within a range of values, or many discrete values.

Other embodiments provide for varying the response time using a microprocessor controller or a digital controller, rather than the analog controller of FIG. 1. Analog controller, as used herein, includes a controller that has at least a part of the controlling preformed using an analog circuit. Digital controller, as used herein, includes a controller that has at least a part of the controlling preformed using an digital circuit. Microprocessor controller, as used herein, includes a controller that has at least a part of the controlling preformed using a microprocessor. Circuit, as used herein, includes analog and/or digital components, and/or a microprocessor and/or software or a portion thereof).

In other embodiments, the power supply is not a MIG power supply, but provides a welding type output or welding-type power for another process. Welding-type output, as used herein, refers to an output suitable for welding, plasma cutting or induction heating. Welding-type power as used herein, refers to welding, plasma or heating power.

Another aspect of this invention relates to control of a welding-type power supply, such as the Miller MM250®, with respect to fast-tack welding. Generally, the invention provides that the controller senses whether or not the process is a fast-tack process. If the process is a fast-tack process, then auxiliary weld parameters, such as wire feed speed during run-in; ramp to run-in wire feed speed, ramp to weld wire feed speed, open circuit voltage, and burnback voltage, are adjusted to be more desirable for fast-tack welding. If it is not a fast-tack process, then the auxiliary parameters are set to values desirable for normal welding.

The preferred embodiment changes the auxiliary parameters for fast-tack welding (relative to their setting for normal welding). The ramp to run-in wire feed speed is faster, the open circuit voltage command increases at a steady rate until it is 14 volts above the welding volt command, the burnback voltage is the same as the volt command during welding (for normal welding its half the weld value). Additionally, an auxiliary winding anti-parallel with, and in magnetic communication with the main output stabilizer could be provided for faster starts, and electronically switched out of the circuit for the remaining parts of the weld. Magnetic communication, as used herein, includes a magnetic connection wherein a magnetic field influencing one winding, influences the other winding.

Figure 2:
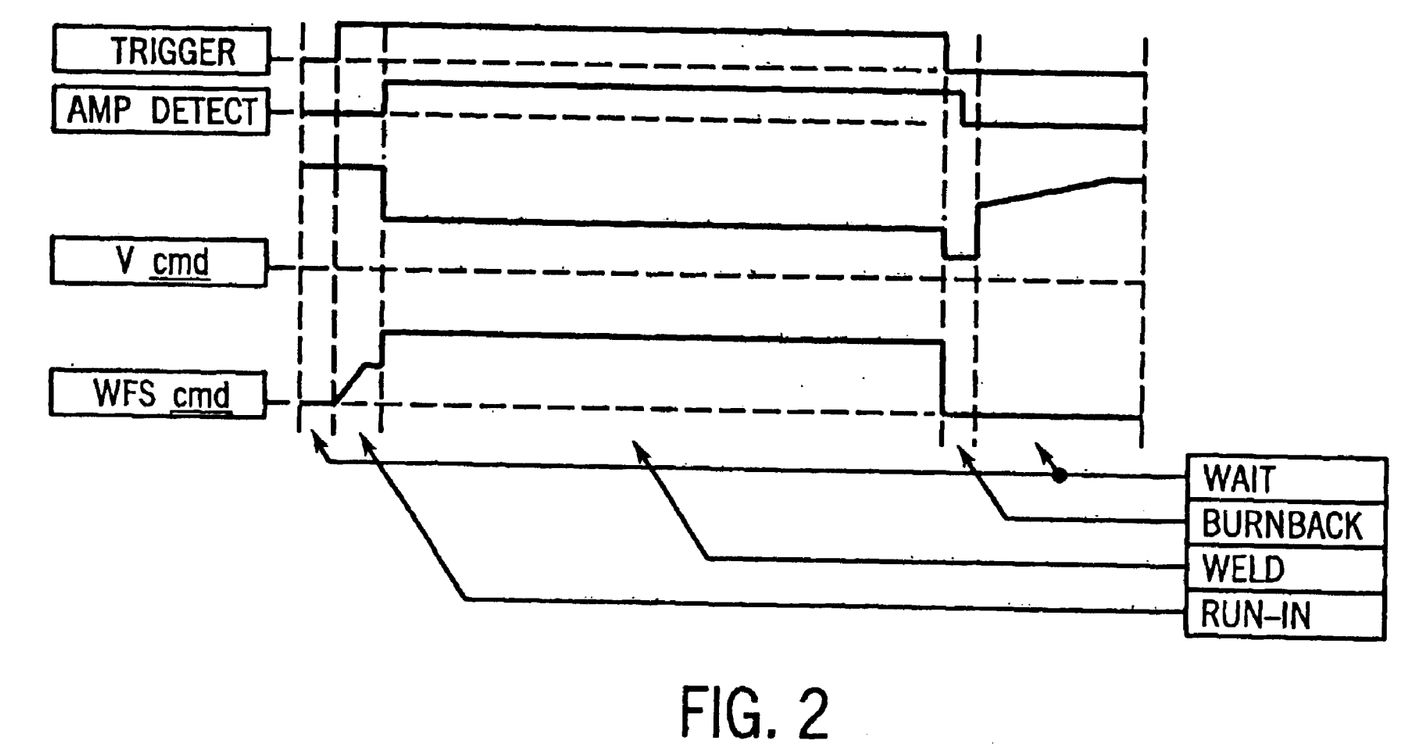
FIG. 2 is timing diagram of a normal weld process.
Figure 3:
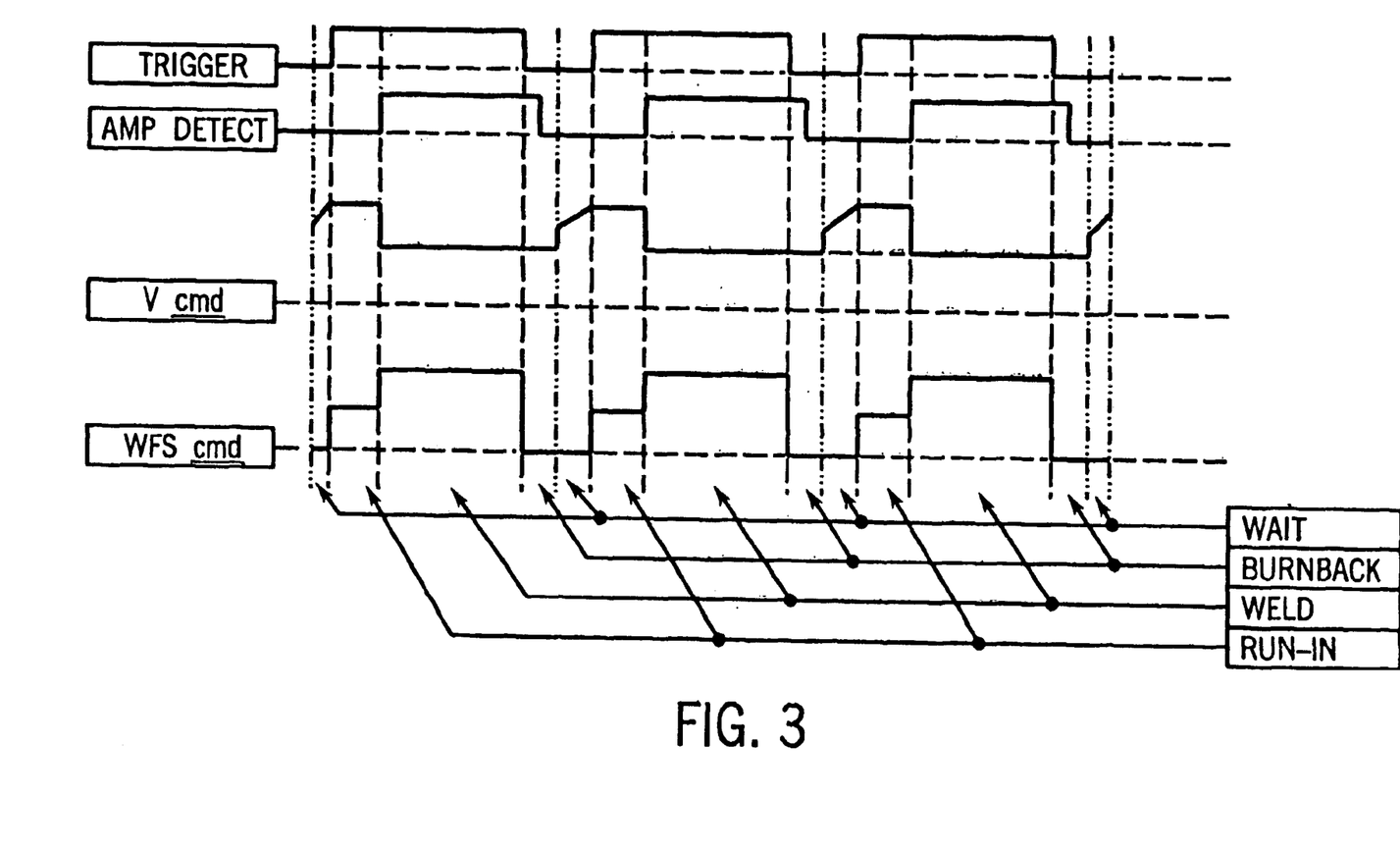
FIG. 3 is a timing diagram of a fast-tack process.

Referring now to FIGS. 2 and 3, timing charts for a normal welding process (FIG. 2) and a fast-tack welding process (FIG. 3) may be seen. The wait period is much longer for normal welds, and the changes to some auxiliary commands, in accordance with the preferred embodiment as described above, are shown.

Figure 4:
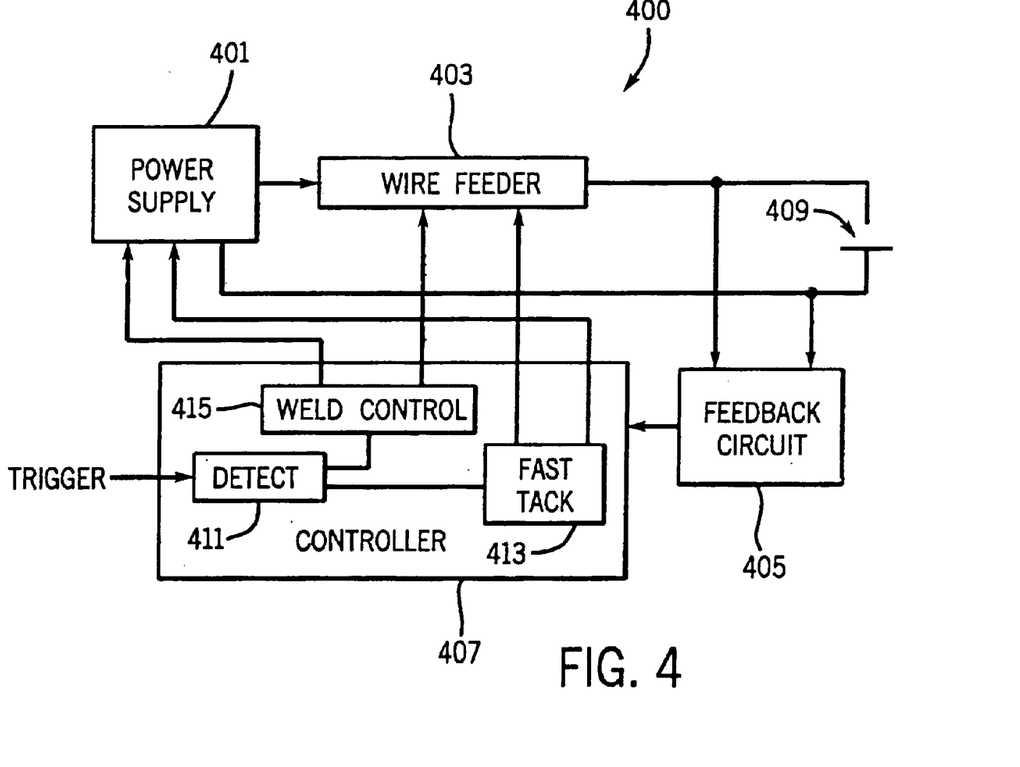
FIG. 4 is a diagram of a welding system in accordance with one aspect of the invention.

FIG. 4 shows a welding power supply or system for welding 400 implementing the preferred embodiment, that includes a welding power source 401, a wire feeder 403, a feedback circuit 405 and a controller 407 that cooperate to provide welding power to an arc 409, wherein the auxiliary parameters have different values for fast-tack welding than for normal welding.

Generally, power source 401 provides welding power to the arc, wire feeder 403 feeds wire to the arc, feedback circuit 405 provides arc feedback, and controller 407 controls the process. Power source 401 has at least one power source control input in electrical communication with a power source control output on controller 407 and a welding power output connected to a wire feeder 403. Wire feeder 403 also includes a wire feed speed input in electrical communication with a speed control output on controller 407. Feedback circuit 405 is responsive to the arc, and provides a feedback output to a feedback input on controller 407.

Controller 407 is digital in the preferred embodiment, and includes a fast-tack detect circuit 411 (preferably software implemented) that receives the trigger signal. Fast-tack detect circuit 411 includes a timer circuit and monitors the time between trigger pulls to determine if the process is a fast-tack process. Preferably it monitors successive trigger pulls, and if they are less than 0.5 seconds apart then fast-tack detect circuit 411 provides a signal indicating the process is a fast-tack process, or if welding is carried out for more than 1.0 seconds, then it indicates a normal weld. Fast-tack detect circuit, as used herein, includes a circuit that detects whether or not a process is a fast-tack process. Alternatives include monitoring something other than trigger pulls, such as wire feed speed, or an output parameter, and monitoring more than two trigger pulls.

Controller 407 also includes a fast-tack control circuit 413 disposed electrically between the fast-tack detect circuit and the power source control output, and disposed electrically between the fast-tack detect circuit and the wire-feed speed output. Fast-tack control circuit 413 sets the power source control outputs and the wire feed-speed control output if a fast-tack process is detected. Fast-tack control circuit, as used herein, includes a controller that provides control outputs particularly suited for a fast-tack process. Electrically between two components, as used herein, includes being in a current path between the two components.

Specifically, fast-tack control circuit 413 (which is preferably software that sets parameter values) sets the ramp to run-in value for the speed control output to a fast-tack value if a fast-tack process is detected. Ramp to run-in command, as used herein, includes a command used to set the rate at which a wire feeder changes to a run-in speed. It also sets the burn back command, open circuit command and weld voltage command to fast-tack values. Burn back command, as used herein, includes a command used to set the burn back voltage of a welding system. Open circuit command, as used herein, includes a command used to set the open circuit voltage of a power supply. Voltage command, as used herein, includes a command used to set the output voltage of a power source.

Controller 407 also includes a weld control circuit 415 (which is also preferably software that sets parameter values) that is disposed electrically between the fast-tack detect circuit and the power-source control output and disposed electrically between the fast-tack detect circuit and the wire-feed speed output. Weld control circuit 415 sets the power source control outputs and the wire feed-speed control output to values for a typical weld process if a fast-tack process is not detected. Weld control circuit, as used herein, includes a controller that provides control outputs particularly suited for a typical welding process.

This aspect of the invention is implemented in an alternative embodiment with an inverter power source to dynamically changing the DI/DT of the initial current at the point of contact. It would also allow tighter control at the start of the arc.

Another aspect of the invention relates to setting the run-in speed for the welding process. This aspect is also preferably implemented with a power supply such as the Miller MM250®. Generally, the invention provides for using the weld wire feed speed front panel potentiometer to set a run-in wire feed speed percentage at power-up. Then, during normal operation the run-in wire feed speed is that percentage of the weld wire feed speed. When the user changes the weld wire feed speed, the run-in wire feed speed also changes (to maintain the percentage). The percentage is set using the knob during power-up.

Figure 5:
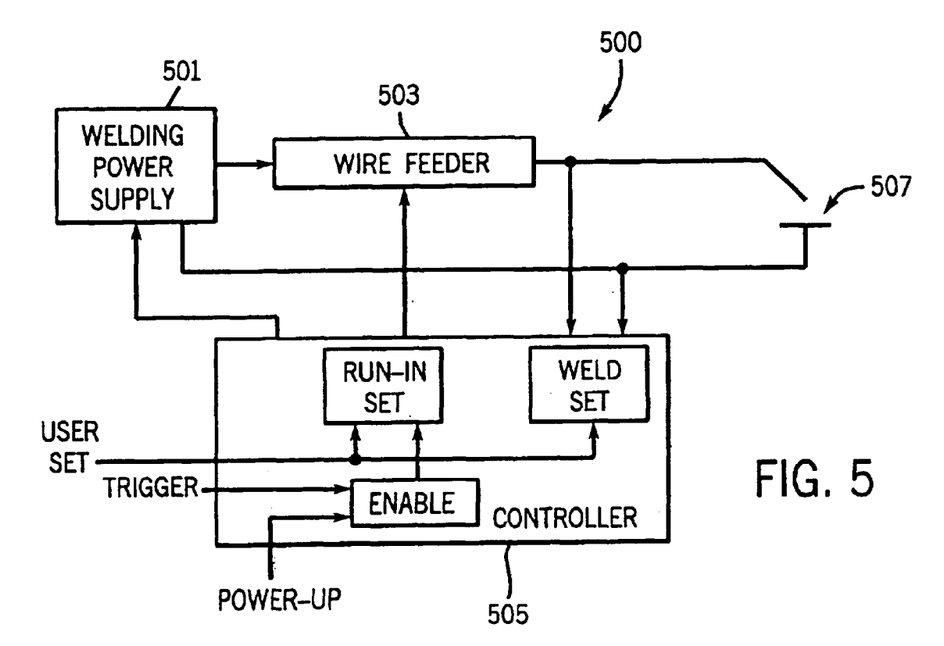
FIG. 5 is a diagram of a welding system in accordance with one aspect of the invention.

Referring now to FIG. 5, a welding system 500 implementing the preferred embodiment is shown, and includes a welding power source 501, a wire feeder 503 and a controller 505, that cooperate to form an arc 507.

Welding power source 501 is preferably a phase controlled power source, and has a welding power output connected to wire feeder 503. Wire feeder 503 has a speed control input.

Controller 505, preferably a microprocessor controller, but alternatively an analog controller, has a speed control output connected to the speed control input. The output has a weld wire speed set point, and a run-in wire speed set point. The run-in speed set point is a user-selected percentage of the weld wire speed set point. The percentage is between 25 percent and 150 percent, in the preferred embodiment.

The weld wire feed speed is received by controller 505, which includes a run-in set circuit. An input (called the percent input) of the run-in set circuit is connected to the weld wire feed speed input. An enable input of the run-in set circuit is connected to a power-up signal and a trigger signal.

When the user wants to set the percentage, they hold the trigger at power-up. When the enable input receives a trigger signal and a power-up signal, the percentage is set based on the position of the wire feed speed knob. Specifically, the operator control panel normally displays voltage and weld wire feed speed at run time. When the operator initiates the programmable run-in (by engaging the trigger during power-up) the top display will show dashes and the bottom display will show the run-in percentage which was previously stored into non-volatile memory. The operator releases the gun trigger and the displays remain the same until a significant change is made to the wire feed speed control potentiometer. The bottom display then changes to show the new run-in wire feed percentage between 25 and 150 as the wire feed speed control potentiometer is moved between the fully counter clockwise and fully clockwise positions. The operator then sets the run-in wire speed percentage as desired. When the operator engages the gun trigger a second time, the run-in wire feed percentage previously displayed will be stored and registered as the new run-in wire feed percentage.

If the operator does not engage the gun trigger while powering the machine, the previously stored run-in wire feed percentage is used. If the operator initiates the run-in programming mode but does not change the weld wire feed speed control potentiometer significantly while in this mode, the previously stored run-in wire feed percentage is used.

An alternative provides that the enable circuit is responsive to a user-set toggle switch. Other alternatives include setting the percentage using a digital input, inc/dec buttons, numeric pads, etc.

The next aspect of the invention relates to calibrating the controller, so that the command signals result in the desired outputs.

Generally, this aspect provides for digitally calibrating the controller, wherein a output commands are scaled to produce desired results. The scaling is preferably done using a line equation (corrected command=uncorrected command * constant slope+constant number). The line parameters are determined by adjusting the output until two known outputs (min and max e.g.) are obtained during a calibration procedure, and comparing the actual user-adjustable setting to the setting that should have provided that output.

The invention preferably uses a microcontroller for factory calibration. The microcontroller uses a value from read only memory as the baseline for each calibration, and provides the user the ability to store a calibration value into EEPROM. The user may also erase the calibration value and revert back to the baseline value at any time.

The calibration apparatus preferably is performed using a calibration pendant such as a handheld enclosure containing switches used for the calibration process. Calibration pendant, as used herein, includes a detachable device used to calibrate a controller or a welding power supply. The handheld enclosure includes a switch for each item being calibrated (voltage and wire feed speed in the preferred embodiment). The switches select the parameter being calibrated. A third switch is used to signal the microcontroller to enter the calibration mode, or to enable calibration.

The calibration mode is entered when power is applied to the unit, and the user turns on one of the switches. Voltage calibration is performed by turning on the voltage switch, and adjusting the voltage control potentiometer on the operator control panel to achieve the desired minimum voltage (14 volts e.g.) from the power source. After the minimum is obtained, the calibrate switch (the third switch) is turned on until "EP1" is shown on a display. Then, the user turns off the calibrate switch and adjusts the voltage control potentiometer on the operator control panel to achieve the desired maximum voltage (28 volts e.g.) from the power source. Then, the user turns on the calibrate switch until "EP1" is shown on a display. Calibration mode is ended by turning off the calibrate switch and the voltage switch.

Wire feed calibration is performed similarly, but the preferred embodiment uses the mid-speed and the max speed for calibration points. The controller uses these values to adjust the commands, and provide an accurate output.

The calibrated values may be reset or erased by turning on the voltage or wire feed speed switch and turning the appropriate control potentiometer on the operator control panel to fully counter clockwise. Then, the calibrate switch is turned on until "EE1" or "EE2" is shown on the display.

The calibration mode is exited by turning off all of the switches on the handheld enclosure and recycling the power to the system.

The digital calibration provides calibration values having zero error tolerance, zero drift. One alternative provides for using a PC to program the calibration values into EEPROM directly, rather than the firmware running on the microcontroller Referring now to FIG. 6, a welding-type power suincludes a power source 601, a wire feeder 603 and a controller 605. Controller 605 is a microprocessor controller and includes a microcontroller.

Figure 6:
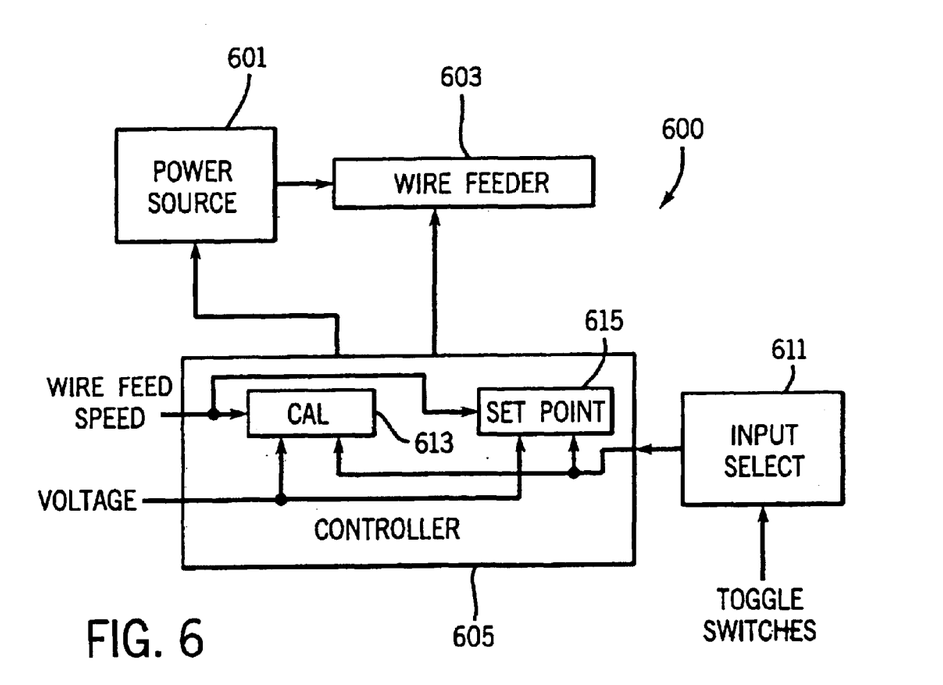
FIG. 6 is a diagram of a welding system in accordance with one aspect of the invention.

Controller 605 is connected to the power source, and has user-selectable inputs, preferably potentiometers on a user control panel, for voltage and wire feed speed. It also has a calibration input 613 to receive either voltage or wire feed speed calibration values. Calibration input, as used herein, includes an input indicative of a calibration value, and/or indicative of a calibration mode. Calibration value, as used herein, includes a value used to calibrate an output or input, such as a scaling factor, or such as one of two points used to create a scaling equation. Control inputs 615 receive the user-selectable set points for voltage and wire feed speed.

Controller 605 includes an input-selection circuit 611 connected to the controller that enables one of calibration input 613 and set point input 615, and disables the other of set point input 613 and calibration input 615. A user-selectable toggle switch is connected to the input-selection circuit.

Numerous modifications may be made to the present invention which still fall within the intended scope hereof. Thus, it should be apparent that there has been provided in accordance with the present invention a method and apparatus for welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for welding, comprising:
    a welding power source having at least one power source control input and a welding power output;
    a wire feeder connected to the welding power output and having a wire feed speed input;
    a feedbadk circuit, responsive to the welding power output, and having a feedback output; and
    a controller, having
        a feedback input connected to the feedback output,
        a fast-tack detect circuit responsive to a trigger signal,
        a speed control output responsive to the fast-tack detect circuit, and in electrical communication with the wire feed speed input, and
        a power source control output responsive to the fast-tack detect circuit, and in electrical communication with power source control input.

2. The system of claim 1 further comprising:
    a fast-tack control circuit disposed electrically between the fast-tack detect circuit and the power source control output, and disposed electrically between the fast-tack detect circuit and the wire-feed speed output; and
    a weld control circuit disposed electrically between the fast-tack detect circuit and the power source control output and disposed electrically between the fast-tack detect circuit and the wire-feed speed output.

3. The system of claim 1, wherein the power source control output includes a voltage command, including at least one of an open circuit command and a burn back command, and the wire feed speed output includes a ramp to run-in command.

4. The system of claim 3, wherein the fast-tack detect circuit includes a timer circuit responsive to a trigger signal.

5. The system of claim 1, further comprising:
    an inductor winding in electrical communication with the welding power output,
    an auxiliary winding in magnetic and electrical communication with the inductor winding; and
    a switch circuit in series with the auxiliary winding;
    wherein the switch circuit is responsive to the fast-tack detect circuit.

6. A method of welding, comprising:
    supplying welding power to an arc;
    feeding wire to the arc;
    feeding back a signal responsive to the welding power;
    detecting whether or not the process is a fast-tack process;
    controlling the supply of power according to a first control scheme if the process is a fast-tack process; and
    controlling the supply of power according to a second control scheme if the process is not a fast-tack process.

7. The method of claim 6 further comprising controlling an open circuit voltage, a burn back voltage, and a ramp to run-in wire feed speed to a first level in the first control scheme and to a different level in the second control scheme.

8. The method of claim 7, wherein detecting includes detecting the time between at least two trigger pulls.

9. A system for performing a welding process, comprising;
    power means for providing welding power to an arc;
    feeder means for feeding wire to the arc;
    feedback means for feeding back a feedback output in response to the welding power provided;
    detect means for detecting whether or not the process is a fast-tack process, connected to a trigger input;
    speed control means for controlling a speed of the feeder means in response to the detect means, in electrical communication with the feeder means; and
    power control means for controlling the power means in response to the detect means, in electrical communication with power means.

10. The system of claim 9, wherein:
    the power control means includes means for controlling at least one of an open circuit command and a burn back command; and
    the speed control means includes means for controlling a ramp to run-in speed command.

11. The system of claim 10, wherein the detect means includes means for determining the time between at least two trigger signals.

12. The system of claim 9, further comprising means for reducing an output inductance when the arc is initiating.

13. A system for welding, comprising:
    means for supplying welding power to an arc;
    means for feeding wire to the arc;
    means for feeding back a signal responsive to the welding tower, in electrical communication with the means for supplying;
    means for detecting whether or not the process is a fast-tack process, responsive and connected to a trigger signal;
    means for controlling the means for supplying according to a first control scheme is the process is a fast-tack process, connected to the means for supplying, and responsive to the means for detecting; and
    means for controlling the means for supplying according to a second control scheme if the process is not a fast-tack process, connected to the means for supplying, and responsive to the means for detecting.

14. The system of claim 13 further comprising means for controlling an open circuit voltage, a burn back voltage, and a ramp to run-in wire feed speed to a first level in the first control scheme and a different level in the second control scheme.

15. The system of claim 14, wherein the means for detecting includes means for detecting the time between at least two trigger pulls.

16. A system for welding, comprising:
    a welding power source having at least one power source control input and a welding power output;
    a wire feeder connected to the welding output and having a wire feed speed input;
    a feedback circuit, responsive to the welding power output and a trigger signal, and having a feedback output; and
    a controller, responsive to the feedback output, and having
        a first control output connected to the power source control input and connected to the wire feed speed input, and
        a second control output connected to the power source control input and connected to the wire feed speed input.

17. The system of claim 16, wherein the first control output is a fast-tack control output and the second control output is a welding control output.

* * * * *